(12) United States Patent
Paik

(10) Patent No.: US 9,834,158 B2
(45) Date of Patent: Dec. 5, 2017

(54) ACOUSTIC FLOORING ASSEMBLY

(71) Applicant: Cary Paik, New York, NY (US)

(72) Inventor: Cary Paik, New York, NY (US)

(*) Notice: Subject to any disclaimer, the term of this patent is extended or adjusted under 35 U.S.C. 154(b) by 0 days.

(21) Appl. No.: 14/093,131

(22) Filed: Nov. 29, 2013

(65) Prior Publication Data

US 2017/0274840 A1    Sep. 28, 2017

(51) Int. Cl.
| | | |
|---|---|---|
| B60R 13/08 | (2006.01) | |
| G10K 11/168 | (2006.01) | |
| B32B 21/13 | (2006.01) | |
| G10K 11/16 | (2006.01) | |

(52) U.S. Cl.
CPC .......... B60R 13/083 (2013.01); G10K 11/168 (2013.01); B32B 21/13 (2013.01); G10K 11/16 (2013.01)

(58) Field of Classification Search
CPC ...... G10K 11/168; E04F 15/107; E04F 15/18; E04F 13/0894; B32B 2419/04
See application file for complete search history.

(56) References Cited

U.S. PATENT DOCUMENTS

| | | | | | |
|---|---|---|---|---|---|
| 3,760,548 | A * | 9/1973 | Sauer | .................... | E04B 1/6179 52/309.11 |
| 8,245,478 | B2 * | 8/2012 | Bergelin | ................. | E04F 15/02 428/192 |
| 2006/0154015 | A1 * | 7/2006 | Miller | ...................... | B32B 7/02 428/50 |
| 2006/0174974 | A1 * | 8/2006 | Brannstrom | ............. | B32B 3/06 144/345 |
| 2008/0168742 | A1 * | 7/2008 | Miclo | ..................... | E04F 15/02 52/745.19 |
| 2008/0261036 | A1 * | 10/2008 | Wu | ......................... | E04F 15/02 428/337 |
| 2008/0271400 | A1 * | 11/2008 | Raidt | ..................... | E04D 3/357 52/408 |
| 2009/0183457 | A1 * | 7/2009 | Boucke | .................... | B32B 3/06 52/425 |
| 2014/0311086 | A1 * | 10/2014 | Braun | ...................... | B32B 5/18 52/783.1 |
| 2015/0121793 | A1 * | 5/2015 | Segaert | ................ | B29C 70/081 52/506.01 |
| 2015/0298426 | A1 * | 10/2015 | Hannig | ................ | B32B 38/145 428/192 |

* cited by examiner

Primary Examiner — Paola Agudelo

(57) ABSTRACT

A flooring assembly comprising a plurality of flooring units each unit comprising a first stability core layer having a top surface, a bottom surface and a plurality of edge surfaces, at least two of the edge surfaces having an interlocking mechanism for attachment to the edge surfaces of the first stability core of adjacent flooring units; a sound attenuating acoustic layer attached to the top surface of the first stability core layer; a second stability core layer attached to the top surface of the acoustic layer and having a top surface, a bottom surface and a plurality of edge surfaces, at least two of the edge surfaces having an interlocking mechanism for attachment to the edge surfaces of the second stability core of adjacent flooring units; and a finish layer attached to the top surface of the second stability core layer, wherein (1) each of the layers is polygonal, and the assembly of flooring units is attachable to a surface of a structure.

15 Claims, 1 Drawing Sheet

ACOUSTIC FLOORING ASSEMBLY

BACKGROUND OF THE INVENTION

Flooring assemblies comprising flooring elements configured to be joined together to form finished floors having acoustic, sound-attenuating properties meeting or surpassing building sound code requirements (STC and IIC ratings) are highly desirous in the building industry. These codes require a high degree of suppression of sound transmissions between floors of buildings. Conventionally employed flooring elements may comprise multi-layer composite laminates having acoustic, sound-attenuating properties adapted for attachment thereof to subfloor substrates.

The most common forms of attachment to subfloors of floor assemblies constructed of conventional flooring elements are mechanical in nature; i.e., nails, staples, bolts, screws, and the like. The penetration of the acoustic, sound-attenuating portions of these laminates with such rigid attachment elements, however, provide sound bridges which result in the direct transmission of vibrational energy, particularly sound energy, through the acoustic layer, thereby deleteriously affecting the sound-attenuating properties thereof. This vibrational energy typically manifests as noise, in particular, low-frequency noise.

The effects of these noise transmitting rigid attachment elements are particularly objectionable in multi-unit buildings, such as condominiums, apartment buildings, and the like. For example, if two units of the multi-unit building, such as a first dwelling area and a second dwelling area located immediately above the first dwelling area, are separated by flooring assemblies attached to the budding structure with sound-bridging mechanical attachment elements, vibrations generated in the second area are transmitted to the first area as noise or other sounds, thereby disturbing the enjoyment of the first area.

It is an object of the present invention to provide thinner and more economical flooring assemblies comprising flooring elements configured to be joined together to form finished floors having acoustic, sound-attenuating properties which are capable of being attached to building structures such as subfloor substrates in a one-step installation process without creating vibrational energy transmitting sound bridges through the acoustic portions thereof, even where the flooring assemblies are mechanically attached to structures.

SUMMARY OF THE INVENTION

This and other objects are realized by the present invention, one embodiment of which relates to a flooring assembly comprising a plurality of flooring units each unit comprising:
 a first stability core layer having a top surface, a bottom surface and a plurality of edge surfaces, at least two of the edge surfaces having an interlocking mechanism for attachment to the edge surfaces of the first stability core of adjacent flooring units;
 a sound attenuating acoustic layer attached to the top surface of the first stability core layer;
 a second stability core layer attached to the top surface of the acoustic layer and having a top surface, a bottom surface and a plurality of edge surfaces, at least two of the edge surfaces having an interlocking mechanism for attachment to the edge surfaces of the second stability core of adjacent flooring units; and
 a finish layer attached to the top surface of said second stability core layer, wherein:
 (1) each of the layers is identically polygonal, and
 (2) the assembly of flooring units is attachable to a surface of a structure The assembly of flooring units of the invention is attachable to a surface of a building structure; e.g., a sub-flooring surface by (1) an adhesive, (2) a mechanical connector extending through either or both of a lower portion of the sound attenuating acoustic layer and/or the first core layer, but not contacting either the finish layer or the second core layer, or (3) a combination of (1) and (2).

DETAILED DESCRIPTION OF THE INVENTION

The invention is predicated on the discovery that flooring assemblies constructed from flooring units as described above effectively isolate any rigid mechanical connecting elements from the finish floor layer thereby avoiding any direct transmission of sound energy between the finish layer and the building structure.

Embodiments of the present disclosure will be described with reference to the drawings. While various exemplary and preferred embodiments will be described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

Figure 1:
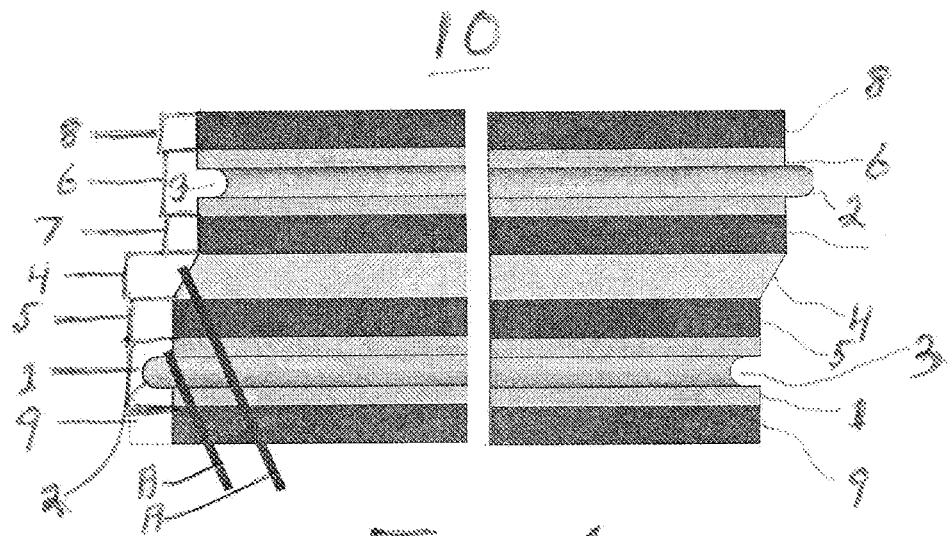
FIG. 1 is a side elevational view of the flooring unit of the invention.
Figure 2:
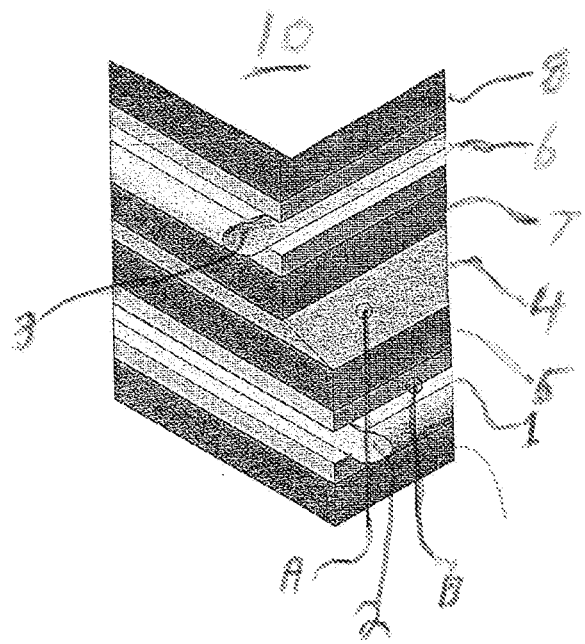
FIG. 2 is a top elevational view of the flooring unit of the invention

Referring to FIGS. 1 and 2, a flooring unit 10 is shown. The unit 10 includes a first polygonal stability core layer 1 having interlocking mechanism, tongue 2 and groove 3, construction along opposed lateral edges for attachment to the edge surfaces of the first stability core layer of an adjacent flooring unit. To the top surface of the first stability core layer 1 is attached a sound attenuating acoustic layer 4. To the bottom surface of the first stability core layer an optional backing layer 9 (further described below) may be attached. Between the first stability core layer 1 and acoustic layer 4, an optional filler layer 5 (further described below) may be interposed. On the top surface of the acoustic layer 4 (or the top surface of the optional layer 5) is attached a second stability core layer 6 having interlocking mechanism, tongue 2 and groove 3, construction, complementary to that of the first stability core layer, for attachment to the edge surfaces of the second stability core layer of an adjacent flooring unit. Between the acoustic layer 4 and core layer 6, an optional filler layer 7 (further described below) may be interposed. On the top surface of the second stability core layer 6 (or the top surface of optional layer 7) is attached a finish layer 8. Each of layers 1 and 4-9 are preferably identically polygonal in shape.

The polygonal flooring units may take any suitable form, such as, for example, rectangular (boards, sheets, and the like) or square (tiles and the like).

Each of the above described layers may be attached to each other by any suitable means; most preferably, adhesively.

A primary advantage of the flooring units of the invention is that they may be assembled and attached to a building structure, such as, for example, a sub-floor to achieve an acoustic floor having no penetrating mechanical connections or rigid penetrations [such as nails] through the "acoustic layer" which would allow sound to bridge the layer, thereby denigrating the sound attenuating properties thereof, and achieving, at the same time, a durable connection between the building structure and the acoustic floor assembly. This is enabled by the unique construction of the flooring units which allows the mechanical connection to occur anywhere in the lower portion of the acoustic layer. Referring to FIGS. 1 and 2, the preferred mechanical connection locations are in the lower portion A of the acoustic layer 4 so that it may be covered by an overlapping acoustic layer from the adjoining piece of flooring or in the protruding (B) tongue element 2 of the first stability core layer 1, avoiding altogether any acoustic penetrations through the acoustic layer that may bridge any sound from the top finish surface 8 to the building structure. The mechanical connector may take any suitable form, such as, for example, nail, screw, staple, bolt, clip, snap, and the like.

The construction and attachment of conventional prior art acoustic flooring requires the following steps:

1. An acoustic layer having the required sound-attenuating value is installed on a subfloor.

2. Two staggered layers of plywood are attached to the top surface of the acoustic layer adding 1½" of thickness.

3. A finish flooring layer (if wood, ¾" thickness) is attached by nailing through the intervening staggered layers of plywood and the acoustic layer to the subfloor, thereby creating the undesirable soundbridges between the finish layer and the subfloor.

Advantageously, the flooring assembly of the invention is constructed and attached to a subfloor as follows:

1. The assembly as described above, 1½"+acoustic layer, saving ¾" over conventional installation of layers 5 & 7 are eliminated, an additional ½" reduction in thickness can be achieved).

Thus, the assembly of the invention eliminates two of the steps required for the installation of prior art flooring assemblies and results in as much as 1¼" thickness saving.

Thus, the flooring assembly of the invention enables the installation of floors in a one-step process which meet or surpass building sound code requirements [STC and IIC ratings] in most major cities in the world.

The flooring assembly is applicable for the installation of any suitable flooring finish. For example, the finish layer 8 may comprise any suitable material such as, for example, stone, wood, ceramic, metal, fabric, carpet, resin, rubber, polymer, or bamboo.

Similarly, the optional layers 5, 7, and 9 may also be constructed of these same finish or other suitable materials.

The acoustic layer 4 may comprise any suitable sound-attenuating construction material, such as, for example, rubber, polymeric or resinous material.

The first and second stability core layers 1 and 6 may also comprise any suitable construction material which will provide structural stability to the flooring unit. Exemplary of such materials are wood, rubber, polymeric or resinous material, or a fiber matrix material.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

I claim:

1. A flooring assembly comprising a plurality of flooring units each unit comprising:
    a first stability core layer having a top surface, a bottom surface and a plurality of edge surfaces, at least two of said edge surfaces having an interlocking mechanism for attachment to the edge surfaces of the first stability core of adjacent flooring units;
    a sound attenuating acoustic layer attached to the top surface of the first stability core layer;
    a second stability core layer attached to the top surface of the acoustic layer and having a top surface, a bottom surface and a plurality of edge surfaces, at least two of said edge surfaces having an interlocking mechanism for attachment to the edge surfaces of the second stability core of adjacent flooring units; and
    a finish layer attached to the top surface of said second stability core layer, wherein:
    (1) each of said first and second stability core layers and said sound attenuating acoustic layer are polygonal,
    (2) said assembly of flooring units is attachable to a surface of a structure, and
    (3) none of the edges of said sound attenuating acoustic layer have an interlocking mechanism for attachment to an edge of an adjacent sound attenuating acoustic layer.

2. The assembly of claim 1 wherein said flooring units are attachable to a surface of a structure by a mechanical connector extending through said sound attenuating acoustic layer and/or said first stability core layer, but not contacting either said finish layer or said second core layer.

3. The assembly of claim 2 wherein said interlocking mechanisms is are tongue and groove construction along opposed lateral edges of said stability cores.

4. The assembly of claim 2 wherein said mechanical connector extending through said sound attenuating acoustic layer and/or said first stability core layer, but not contacting either said finish layer or said second core layer is a nail, screw, staple, bolt, clip, or snap.

5. The assembly of claim 4 wherein said mechanical connector is a nail.

6. The assembly of claim 1 wherein each of said plurality of flooring units has a backing layer attached to the bottom surface of said first core layer.

7. The assembly of claim 6 wherein said backing layer comprises stone, wood, ceramic, metal, fabric, carpet, resinous, rubber, polymeric, or bamboo material.

8. The assembly of claim 1 wherein said layers are attached to each other by an adhesive.

9. The assembly of claim 1 wherein said finish layer comprises stone, wood, ceramic, metal, fabric, carpet, resin, rubber, polymer, or bamboo.

10. The assembly of claim 1 wherein said stability core layers comprise wood, rubber, polymeric or resinous material, or a fiber matrix material.

11. The assembly of claim 1 which is square or rectangular in shape.

12. The assembly of claim 11 wherein said flooring units are in the form of boards.

13. The assembly of claim 11 wherein said flooring units are in the form of tiles.

14. The assembly of claim 1 wherein a filler layer is interposed (1) between said first stability core layer and said sound attenuating acoustic layer, or (2) between said second stability core layer and said sound attenuating acoustic layer.

15. The assembly of claim 1 wherein said building structure surface to which said assembly of flooring units is attachable is a sub-floor.

* * * * *